Patented July 29, 1930

1,771,802

UNITED STATES PATENT OFFICE

BERTRAM MAYER AND HUGO SIEBENBÜRGER, OF BASEL, SWITZERLAND, ASSIGNORS TO THE FIRM: SOCIETY OF CHEMICAL INDUSTRY IN BASLE, OF BASEL, SWITZERLAND

VAT DYESTUFFS AND PROCESS OF MAKING SAME

No Drawing. Application filed November 23, 1926, Serial No. 150,371, and in Switzerland December 8, 1925.

The present invention relates to new dyestuffs valuable for the production of fast tints on the fibre. It comprises the new products, the process of making same, and the material dyed with the new dyestuffs.

It is well known that by halogenizing violanthrone halogenized dyestuffs are obtained which dye cotton more or less bluish-violet tints. These dyeings show all the disadvantageous property of being very sensitive to water, becoming thus redder.

It has been found that by treating violanthrone at temperatures above 80° C. with chlorine or agents yielding chlorine in presence of organic diluents which are not miscible with water, such as nitro or chlorohydrocarbons, and with so much of a chlorinating agent that about 3 atoms of chlorine enter the dyestuff molecule, there are obtained new products which form dark powders, dissolving in concentrated sulfuric acid with violet coloration and which differ from the halogenized violanthrones hitherto known by the pure navy blue shades fast to water which they yield on cotton. The place in which the chlorine atoms are attached to the molecule of the violanthrone corresponding with the formula:

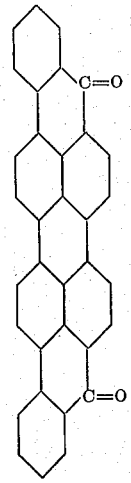

is not known. The chlorinating process, so that 3 halogen atoms enter the dyestuff molecule, may be conducted with chlorine gas in such a manner that chlorine is led into the reaction mass until a sample shows that 3 chlorine atoms have been absorbed by the dyestuff, or, if chlorinating agents, such as sulfuryl chloride, have been used, with sufficient quantities, i. e. at least with 2½ parts and at a sufficiently high temperature (above 80° C.).

Example 50 parts of violanthrone are suspended in 1000 parts of nitrobenzene and treated at 135–140° C. cautiously with 50 parts of chlorine gas. The reaction liquid becomes at first somewhat thick and then fluid. After cooling the chlorinated product is separated by filtration, then washed with nitrobenzene and the remaining nitrobenzene is driven off with steam.

The new dyestuff forms a dark powder, dissolving in concentrated sulfuric acid with a violet coloration. When poured into water the dyestuff separates in blue flakes from the sulfuric acid solution. It dissolves in boiling xylene with violet-blue coloration and orange-red fluorescence, in boiling nitrobenzene with violet-blue coloration and brownish-red fluorescence. The vat is greenish-blue with blue bloom. The dyestuff dyes cotton very fast navy blue tints which are especially fast to water.

Similar products are obtained by replacing the chlorine by agents yielding chlorine, as for instance sulfuryl chloride, sulfur dichloride or solutions of chlorine in sulfur dichloride. As already mentioned in the introduction, one may also operate at lower temperatures and other diluents than nitrobenzene, not miscible in water, may also be employed.

What we claim is:—

1. A process for the production of vat dyestuffs consisting in chlorinating violanthrone at a temperature between 80° and 160° C. and in presence of an organic diluent which is not miscible with water, with so much of a chlorinating agent that about 3 chlorine atoms enter the dyestuff molecule.

2. A process for the production of vat dyestuffs consisting in chlorinating violanthrone at a temperature between 80° and 160° C. and in prescence of nitrohydrocarbons, with so much of a chlorinating agent that about 3 chlorine atoms enter the dyestuff molecule.

3. A process for the production of vat dyestuffs consisting in chlorinating violanthrone with chlorine gas at a temperature between 80° and 160° C. and in presence of nitrohydrocarbons with so much of a chlorinating agent that about 3 chlorine atoms enter the dyestuff molecule.

4. A process for the production of vat dyestuffs consisting in chlorinating violanthrone at a temperature between 80° and 160 C. and in presence of nitrobenzene with so much of a chlorinating agent that about 3 chlorine atoms enter the dyestuff molecule.

5. A process for the production of vat dyestuffs consisting in chlorinating violanthrone with chlorine gas at a temperature between 80° and 160° C. and in presence of nitrobenzene with so much of a chlorinating agent that about 3 chlorine atoms enter the dyestuff molecule.

6. The herein described chlorine substitution products of violanthrone containing about 3 chlorine atoms, which products form dark powders dissolving in concentrated sulfuric acid with violet coloration and which differ from the halogenized violanthrones hitherto known by the pure navy blue shades fast to water which they yield on cotton.

7. The herein described chlorine substitution product of violanthrone containing about 3 chlorine atoms, which may be produced by chlorinating violanthrone between 100° and 160° C. with chlorine gas in presence of nitrobenzene, which product forms a dark powder, dissolving in concentrated sulfuric acid with a violet coloration, in boiling xylene with violet blue coloration and orange-red fluorescence in boiling nitrobenzene with violet-blue coloration and brownish-red fluoresence, yielding a greenish-blue vat from which cotton is dyed very fast navy blue tints especially fast to water.

8. Material dyed with the dyestuff of claim 6.

9. Material dyed with the dyestuff of claim 7.

In witness whereof we have hereunto signed our names this 11th day of November, 1926.

BERTRAM MAYER.
HUGO SIEBENBÜRGER.